3,376,311
1-LOWER ALKYLSULFONYLALKYL-2-LOWER
ALKYL-5 NITROIMIDAZOLES
Kenneth Butler, Waterford, Conn., assignor to Chas.
Pfizer & Co., Inc., New York, N.Y., a corporation of Delaware
No Drawing. Continuation-in-part of application Ser. No. 406,542, Oct. 26, 1964. This application Aug. 5, 1966, Ser. No. 570,433
5 Claims. (Cl. 260—309)

ABSTRACT OF THE DISCLOSURE

Novel 1,2-di-substituted 5-nitroimidazoles and their acid addition salts are prepared, particularly imidazoles of the formula

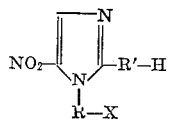

where R and R' are each alkylene of 1 to 7 carbons and X is halogen, lower alkylsulfoxy, lower alkylsulfonyl or trifluoromethyl.

---

This is a continuation-in-part of application Ser. No. 406,542, filed Oct. 26, 1964. This invention relates to novel imidazole derivatives and, more particularly, it is concerned with certain 5-nitroimidazole compounds having a high degree of anti-trichomonal activity.

Examples of trichomonal infections include trichomonal vaginitis, a troublesome vaginal infection caused by the parasitic protozoan *Trichomonas vaginalis* and bovine trichomoniasis caused by *Trichomonas foetus*. Up to now, various medicaments and methods of treatment have been used with varying degrees of effectiveness. In the treatment of vaginitis, a number of different drug classes are involved, for example, sulfonamides, fungicides, penicillin, vaginal cleansers, etc. In addition, a variety of product forms are currently utilized: ointments, jellies, creams, powders, douches, vaginal tablets, vaginal suppositories, oral tablets, liquids, and several other forms.

It has now been found that the novel compounds disclosed herein are surprisingly more effective than those hereinbefore employed. Accordingly, the present invention discloses and claims compounds designated by the following formula:

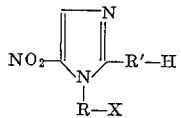

wherein R and R' are each alkylene having 1 to 7 carbon atoms and X is lower alkylsulfonyl and the pharmaceutically-acceptable acid addition salts thereof.

Specific examples include:

1-(2-ethylsulfonylethyl)-2-methyl-5-nitroimidazole
1-(2-propylsulfonylethyl)-2-methyl-5-nitroimidazole
1-(2-methylsulfonylethyl)-2-methyl-5-nitroimidazole
1-(2-isopropylsulfonylethyl)-2-methyl-5-nitroimidazole These compounds can be prepared by either one of two general procedures. The first comprises reacting an appropriate alkylmercaptan with a 5-nitroimidazole derivative having substituted thereon a chloroalkylene side chain in a suitable solvent. The resulting thio compound is then treated with two stoichiometric equivalents of hydrogen peroxide to provide the corresponding sulfonyl compound.

The second general procedure consists of reacting an appropriate alkylsulfonyl ester of p-toluene sulfonic acid with a 5-nitroimidazole derivative and recovering the product.

To illustrate, to prepare 1-(2-ethylsulfonylethyl)-2-methyl-5-nitroimidazole by the first procedure, one would react 1-(2-chloroethyl)-2-methyl-5-nitroimidazole with ethylmercaptan to provide 1-(2-ethylthioethyl)-2-methyl-5-nitroimidazole. This product is then oxidized with two equivalents of 50% hydrogen peroxide solution to give the desired product. To prepare the same product by means of the second procedure, one would treat 2-methyl-5-nitroimidazole with ethylsulfonylethyl-p-toluene sulfonate and the product recovered and crystallized from the reaction mixture. On the basis of the number of steps involved and reaction periods, it is more preferred to take advantage of the second synthetic procedure; however, on the basis of yields, both are equally desirable.

The 5-nitroimidazole compounds disclosed herein are preferably administered as such or in the form of acid addition salts containing pharmaceutically acceptable anions. Examples of acids which provide pharmaceutically-acceptable anions are hydrochloric, hydrobromic, hydroiodic, nitric, sulfuric, or sulfurous, phosphoric, acetic, lactic, citric, tartaric, oxalic, succinic, maleic and gluconic. The conversion of the herein disclosed 5-nitroimidazole compounds to their acid addition salts comprises treating said compounds with a substantially equimolar amount of a chosen acid in an aqueous solution or in a suitable organic solvent such as methanol or ethanol. When such salts are to be used for human consumption, either orally or parenterally, the acids which are used to prepare the pharmaceutically-acceptable addition salts must, of course, be those which necessarily form non-toxic acid addition salts.

The following examples are provided by way of illustration and should not be interpreted as limiting the invention, many variations of which are possible without departing from the spirit or scope thereof.

Example I.—1-(2-ethylsulfonylethyl)-5-nitroimidazole

An aqueous solution containing 1-(2-chloroethyl)-5-nitroimidazole hydrochloride is made basic with a methanolic KOH solution, followed by the addition of ethyl mercaptan. The resulting mixture is allowed to stand for several days and subsequently evaporated to dryness. The crude product is crystallized from i-propanol to give substantial yields of 1-(2-ethylthioethyl)-5-nitroimidazole.

The product obtained by this procedure is converted to the corresponding sulfoxy and sulfone derivatives by dissolving in acetic acid and treating with a 50% $H_2O_2$ solution. The sulfoxy compound is obtained using a stoichiometric equivalent amount of said hydrogen peroxide, whereas the sulfone derivative is produced when 2 stoichiometric equivalents of $H_2O_2$ per thio compound is used.

Example II.—1-(2-ethylsulfonylethyl)-2-methyl-5-nitroimidazole (A) A mixture of 2-methyl-5-nitroimidazole (12.7 g., 0.1 M) and ethylsulfonylethyl-p-toluenesulfonate (58.4 g., 0.2 M) is heated with stirring, under nitrogen, at 145–150° C. for about 4 hours. After this time, the reaction mixture is extracted with 500 ml. hot water, the aqueous portion adjusted with 10% $Na_2CO_3$ to a pH of 9 and extracted with chloroform (3× with 150 ml. portions). The separated organic phase is washed with water, dried with $Na_2SO_4$ and evaporated to dryness. The crude product is then crystallized from benzene to give 4.36 g. of product having an M.P. 127–128° C.

*Analysis.*—Calculated for $C_8H_{13}N_3O_4S$: C, 38.86%; H, 5.30%; N, 16.99%. Found: C, 38.89%; H, 5.30%; N, 16.68%.

(B) The preparation of ethylsulfonylethyl-p-toluenesulfonate is carried out in the following manner: ethyl sulfonylethanol (69.0 g., 0.5 M) dissolved in 150 ml. pyridine is cooled to 0° C. with stirring and while maintaining the temperature between 0° C. to 10° C., p-toluenesulfonyl chloride (95 g., 0.5 M) is added in portions over a 10 min. period. After this time, water (250 ml.) is added slowly and the mixture extracted with chloroform, the organic phase washed first with 2 N HCl, then with water, separated and dried. The product which crystallizes on cooling is filtered and dried to give 77.5% yield of product.

Example III.—1-(2-propylsulfonylethyl)-2-methyl-5-nitroimidazole

The procedure of Example II (Part A) is repeated wherein a stoichiometric equivalent amount of propylsulfonyl ethyl-p-toluenesulfonate is used in place of ethylsulfonyl ethyl-p-toluenesulfonate with comparable results. The product is obtained in good yields and has a M.P. 94–95° C.

Similarly, propylsulfonyl ethyl-p-toluenesulfonate is obtained in good yields by substituting an equivalent amount of propyl sulfonylethanol for ethylsulfonylethanol in procedure B of Example II (Part B).

Example IV.—1-(2-methylsulfonylethyl)-2-methyl-5-nitroimidazole

The procedure of Example II (Part A) is repeated wherein a stoichiometric equivalent amount of methylsulfonyl ethyl-p-toluenesulfonate is used in place of ethylsulfonyl ethyl-p-toluenesulfonate with comparable results. The product is obtained in good yields and has a M.P. 150–151° C.

Similarly, methylsulfonyl ethyl-p-toluenesulfonate is obtained in good yields by substituting an equivalent amount of methylsulfonyl ethanol for ethyl sulfonylethanol in procedure B of Example II (Part B).

Example V.—1-(2-isopropylsulfonylethyl)-2-methyl-5-nitroimidazole

The procedure of Example II (Part A) is repeated wherein a stoichiometric equivalent amount of isopropylsulfonyl ethyl-p-toluenesulfonate is used in place of ethylsulfonyl ethyl-p-toluenesulfonate with comparable results. The product is obtained in good yields and has a M.P. 135–136° C.

Similarly, isopropylsulfonyl ethyl-p-toluenesulfonate is obtained in good yields by substituting an equivalent amount of isopropylsulfonyl ethanol for ethyl sulfonylethanol in procedure B of Example II (Part B).

Example VI

The procedure of Example II (Part A) is repeated wherein equivalent amounts of the following p-toluene sulfonate derivative and imidazole compounds are used in place of ethylsulfonyl ethyl-p-toluene sulfonate and 2-methyl-5-nitroimidazole and the indicated products are obtained in substantial yields:

| p-Toluene sulfonate derivative | Imidazole compound | Product |
|---|---|---|
| Butylsulfonyl hexyl-p-toluene sulfonate. | 2-ethyl-5-nitro-imidazole. | 1-(6-butylsulfonylhexyl)-ethyl-5-nitroimidazole. |
| Ethylsulfonyl propyl-p-toluenesulfonate. | 2-propyl-5-nitro-imidazole. | 1-(3-ethylsulfonylpropyl)-2-propyl-5-nitroimidazole. |
| Methylsulfonyl butyl-p-toluenesulfonate. | 2-heptyl-5-nitro-imidazole. | 1-(4-methylsulfonylbutyl)-2-heptyl-5-nitroimidazole. |
| Methylsulfonyl methyl-p-toluenesulfonate. | 1-methyl-5-nitro-imidazole. | 1-methyl-2-(methyl sulfonylmethyl)-5-nitroimidazole. |
| Butylsulfonylheptyl-p-toluenesulfonate. | 1-heptyl-5-nitro-imidazole. | 1-heptyl-2-(7-butylsulfonylheptyl)-5-nitroimidazole. |

Example VII

The 5-nitroimidazole compounds disclosed herein may be converted to their acid addition salts by the following general procedure: To a methanolic solution containing 5-nitroimidazole free base (1 M) is added a stoichiometric equivalent amount of a suitable acid. The resulting solution is subsequently stripped free of solvent and the precipitate (acid addition salt) is filtered and dried. Other suitable solvents, for example, ethanol, water, or mixtures thereof may be utilized.

What is claimed is:

1. A compound of the formula:

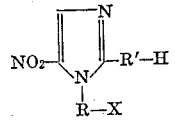

wherein R and R' are each alkylene having 1 to 7 carbon atoms and X is lower alkylsulfonyl and the pharmaceutically-acceptable acid addition salts thereof.

2. A compound as claimed in claim 1 wherein R is alkylene having 1 to 7 carbon atoms, X is lower alkylsulfonyl, R' is methylene.

3. A compound as claimed in claim 1 wherein R is ethylene, X is ethylsulfonyl, R' is methylene.

4. A compound as claimed in claim 1 wherein R is ethylene, X is propylsulfonyl, R' is methylene.

5. A compound as claimed in claim 1 wherein R is ethylene, X is methylsulfonyl, R' is methylene.

References Cited

UNITED STATES PATENTS 3,236,856  2/1966  Parnell _____ 260—309

ALEX MAZEL, *Primary Examiner.*

NICHOLAS RIZZO, *Examiner.*

J. TOVAR, *Assistant Examiner.*